June 16, 1964 K. H. CARPENTER 3,137,135
HYDRAULICALLY OPERATED WINDSHIELD WIPER SYSTEM
Filed June 27, 1962 4 Sheets-Sheet 1

INVENTOR.
Keith H. Carpenter
BY
*W. E. Finkam*
HIS ATTORNEY

June 16, 1964   K. H. CARPENTER   3,137,135
HYDRAULICALLY OPERATED WINDSHIELD WIPER SYSTEM
Filed June 27, 1962   4 Sheets-Sheet 2
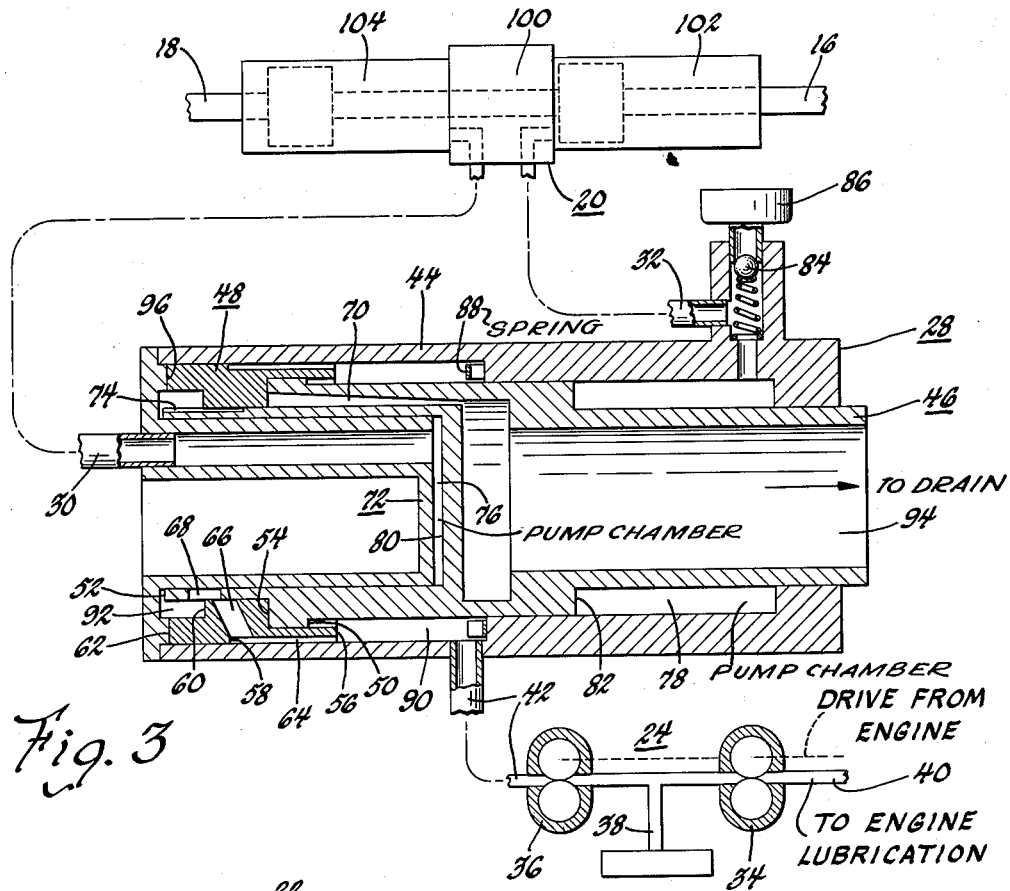
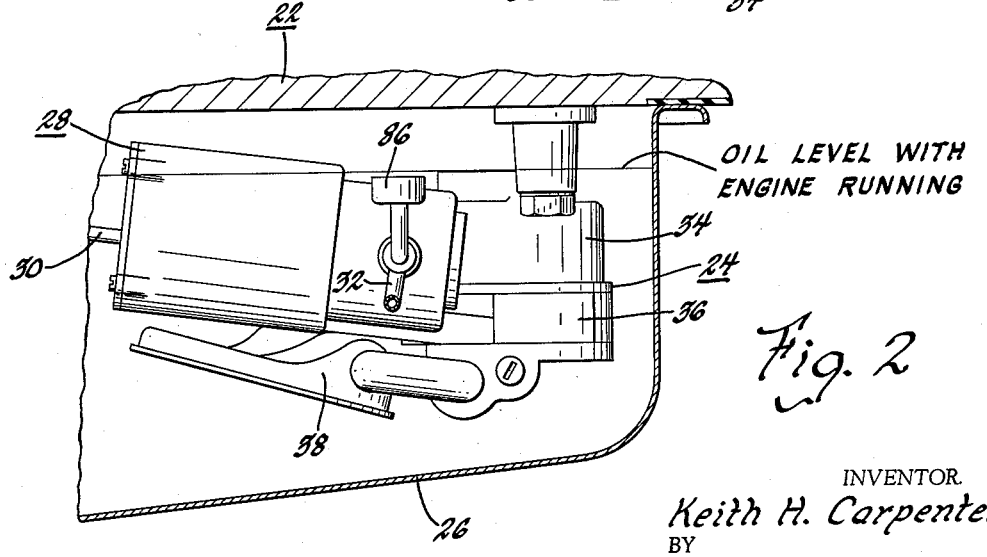
INVENTOR.
Keith H. Carpenter
BY
HIS ATTORNEY June 16, 1964      K. H. CARPENTER      3,137,135
HYDRAULICALLY OPERATED WINDSHIELD WIPER SYSTEM
Filed June 27, 1962      4 Sheets-Sheet 3

INVENTOR.
Keith H. Carpenter
BY
W. E. Finken
HIS ATTORNEY

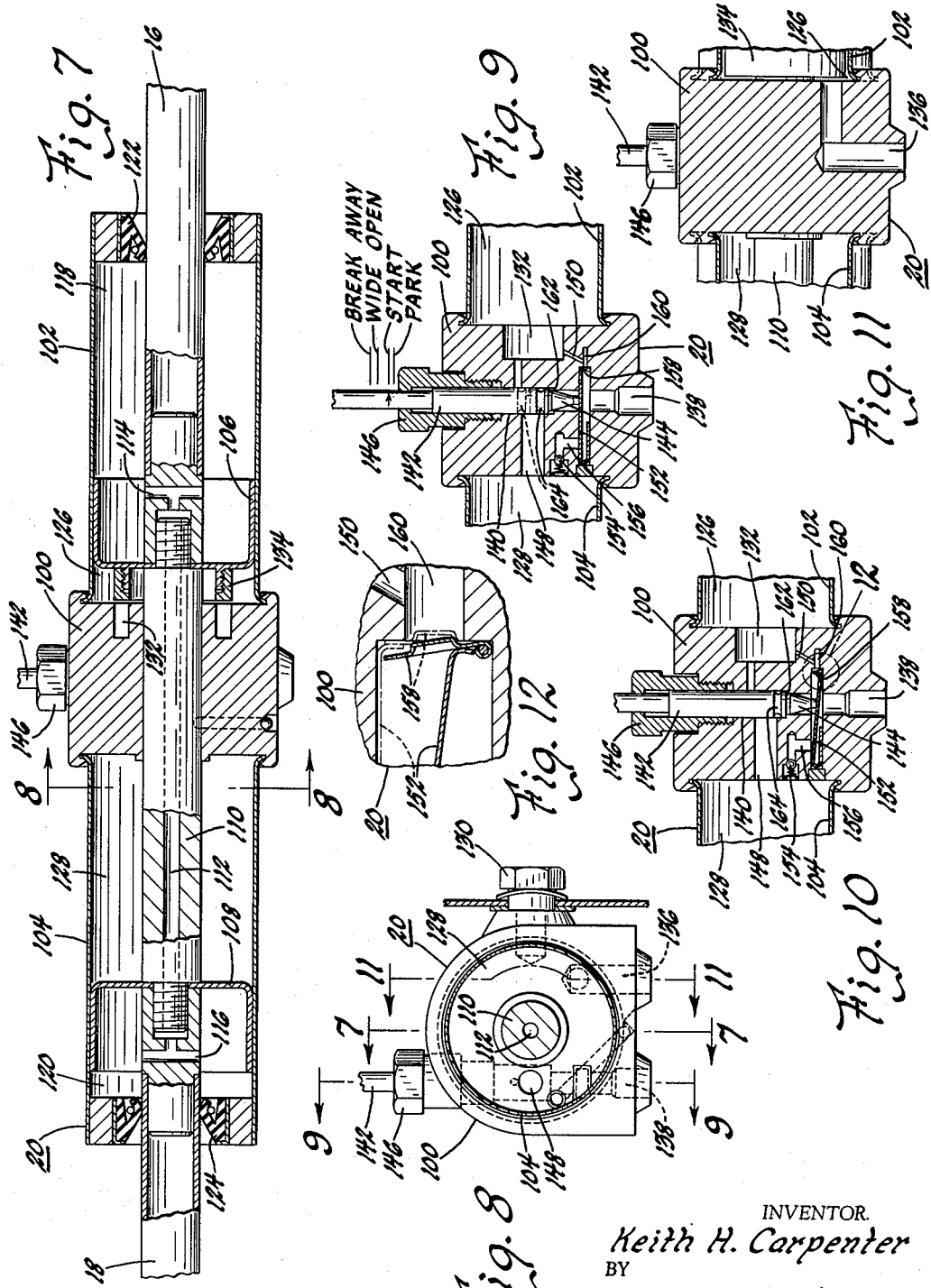

United States Patent Office 3,137,135
Patented June 16, 1964

3,137,135
HYDRAULICALLY OPERATED WINDSHIELD
WIPER SYSTEM
Keith H. Carpenter, Pittsford, N.Y., assignor to General
Motors Corporation, Detroit, Mich., a corporation of
Delaware
Filed June 27, 1962, Ser. No. 205,692
15 Claims. (Cl. 60—52)

This invention pertains to a hydraulically operated windshield wiper system, and particularly to a hydraulic wiper system utilizing engine lubricating oil, but wherein the system will only draw oil from a crank case which is substantially full.

Hydraulically operated windshield wiper systems for motor vehicles have several inherent advantages over other types of windshield wiper actuating mechanisms, namely self-lubrication; infinitely variable speed control; and a readily obtainable substantially constant length wiper stroke. In the past it has been proposed to utilize a separate hydraulic system for operating motor vehicle accessories, including windshield wipers, but such systems have not been adopted due to the cost thereof. It has also been proposed to utilize the excess flow and pressure developed by other hydraulically operated accessories, such as power steering or automatic transmissions, but systems of this type cannot be used on motor vehicles which do not have such accessories. Heretofore, the use of engine lubricating oil has not been deemed feasible since a failure in the hydraulic system could result in draining the engine crank case very quickly so as to cause damage to the vehicle engine.

The present invention relates to an improved hydraulically operated windshield wiper system for motor vehicles wherein a hydraulic failure will only result in loss of a small portion of the crank case oil. To achieve this result, the present invention comprehends the use of a combination motor-pump and a reversing valve assembly mounted within the crank case and operated continuously by a portion of the engine lubricating oil which is pressurized apart from, or independently of, the engine lubricating system, and wherein the wiper motor, per se, is hydraulically connected to the combination motor-pump and reversing valve assembly through a closed loop hydraulic system to which make-up oil is supplied from the crank case, but only when the crank case is substantially full. Thus, any leakage, or hydraulic failure, outside of the crank case will result in only the loss of a small portion of the engine lubricating oil.

Accordingly, among my objects are the provision of an improved hydraulically operated windshield wiper system utilizing engine lubrication oil; the further provision of an improved hydraulic pressure generating system for a motor vehicle which utilizes only a small portion of the total volume of engine lubricating oil, and wherein a failure in the pressure generating system results in the loss of only a minor portion of the total volume of engine lubricating oil; the further provision of a piston-valve assembly which constitutes an integral motor-pump for alternately pressurizing oil in a closed loop hydraulic system in opposite directions; the further provision of a hydraulically operated wiper system including means for applying forces in opposite directions to loosen immovable wiper blades; and the still further provision of a hydraulically operated windshield wiper system wherein the velocity of wiper blade movement is relatively constant and wherein the speed control is effected by varying periods of hesitation at one stroke end.

The aforementioned and other objects are accomplished in the present invention by utilizing a stacked engine driven pump assembly in the crank case, one pump being used to supply the engine lubricating system, and the second pump being used to supply the accessory pressure generating system. The maximum pressure developed by each of the pumps is controlled by the usual bypass valves of conventional design, and the pumps are provided with a common intake and separate outlets. The outlet of the accessory pump is connected to the piston valve assembly which is mounted within the engine crank case, which assembly comprises a cylinder and piston, reciprocation of the piston being controlled by a sleeve valve arrangement. The piston has separate and distinct motor and pump surfaces and a pair of expansible and contractable chambers containing the pump surfaces which are connected to the closed loop hydraulic system.

The intake for the closed loop hydraulic system is located in the upper portion of the crank case so as to be normally submerged when the crank case is substantially full under the normal engine operating conditions. When the pressure generator is used for operating a hydraulic windshield wiper motor, opposed expansible chambers of the wiper motor are connected to opposed expansible chambers of the piston-valve assembly. The wiper motor is controlled by a manual valve connected in one of the lines for throttling the flow, or cutting it off entirely. If there should be a hydraulic failure in the closed loop hydraulic system, it is apparent that only a small quantity of the total volume of the engine lubricating oil will be lost before the intake to the closed loop system will be exposed to air. The piston valve assembly will reciprocate continuously whenever the engine is operating.

Further objects and advantages of the present invention will be apparent from the following description, reference being had to the accompanying drawings, wherein a preferred embodiment of the present invention is clearly shown.

In the drawings:

FIGURE 2 is an enlarged fragmentary sectional view taken along line 2—2 of FIGURE 1.

FIGURE 3 is a composite view, partly in schematic and partly in cross-section, of the improved hydraulic system.

FIGURE 7 is a fragmentary view, partly in section and partly in elevation, of the wiper motor taken along lines 7—7 of FIGURE 8.

FIGURE 8 is a sectional view taken along line 8—8 of FIGURE 7.

FIGURE 9 is a sectional view taken along line 9—9 of FIGURE 8, with the control valve in the "on" position.

FIGURE 10 is a view similar to FIGURE 9 showing the manual control valve in the "park" position.

FIGURE 11 is a sectional view taken along line 11—11 of FIGURE 8.

FIGURE 12 is an enlarged fragmentary sectional view taken in the circle 12 of FIGURE 10.

Figure 1:
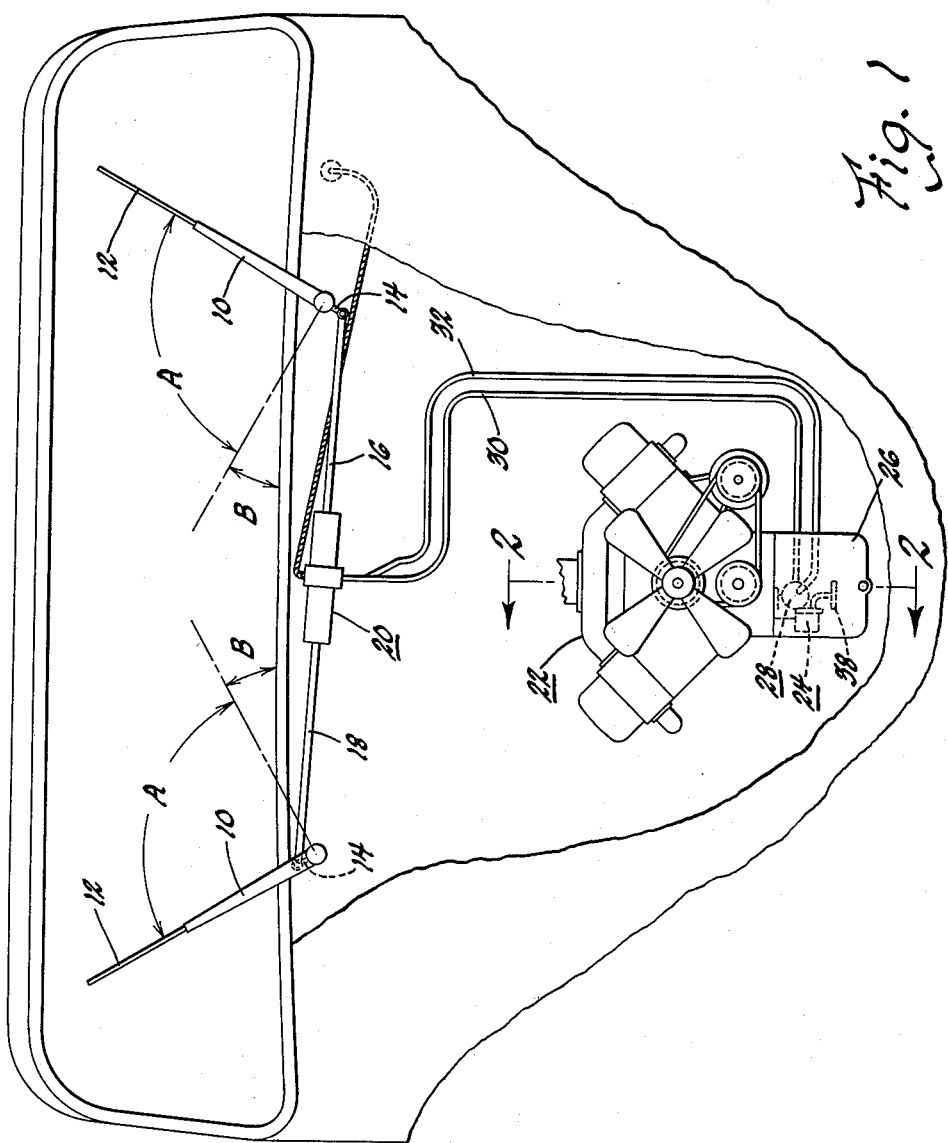
FIGURE 1 is a fragmentary view with certain parts broken away depicting a vehicle equipped with the hydraulic windshield wiper system of the present invention.
Figure 4:
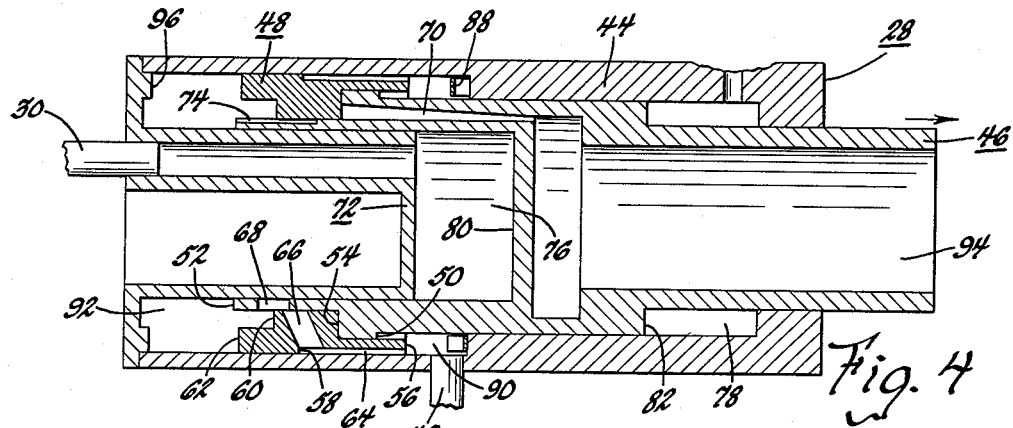
FIGURES 4 through 6 are longitudinal sectional views showing various positions of the piston valve assembly.

With particular reference to FIGURE 1, a wiper system for a vehicle is shown including a pair of oscillatable wiper arms 10 including spring hinge connected inner and outer sections, each wiper arm carrying a wiper blade 12. The wiper arms 10 are drivingly connected to spaced oscillatable pivot shafts, not shown, operated by crank arms 14 to which the outer ends of links 16 and 18 are connected. The links 16 and 18 have reciprocable motion imparted thereto by a wiper motor 20 mounted adjacent the center of the vehicle, which wiper motor will be described in detail hereinafter.

The vehicle includes an internal combustion engine 22 having a pump assembly 24 disposed within a crank case 26. A piston-valve assembly 28 is connected by conduits 30 and 32 to the wiper motor 20, the assembly 28 likewise being disposed within the crank case 26.

Referring to FIGURES 2 and 3, the pump assembly 24 comprises a pair of stacked pumps 34 and 36 which are driven by a common shaft, not shown, from the engine. The pump 34, as shown schematically in FIGURE 3, supplies the engine lubricating system while the pump 36 supplies the accessory system. The pumps 34 and 36 have a common inlet 38 to the crank case, or sump, 26. The output of the pump 34 is connected by a conduit 40 to the usual lubricating passages of the engine, maximum oil pressure being determined by the usual bypass valve, not shown. The accessory pump 36 is connected to an outlet conduit 42, the maximum pressure of which is likewise controlled by a bypass valve, not shown.

The outlet conduit 42 of the accessory pump 36 is connected to the piston-valve assembly 28 which is disposed within the crank case 26. The assembly 28 comprises a cylinder 44 having a reciprocable sleeve-type piston 46 disposed therein. A ring valve 48 is slidably mounted on, but restrained against rotation relative to, the sleeve piston 46, the sleeve piston 46 having annular pressure responsive surfaces 50 and 52, and an annular shoulder 54. The area of surface 52 is greater than the area of surface 50. The ring valve 48 has annular pressure responsive surfaces 56, 58, 60 and 62. The annular surface 58 is formed by a peripheral annular relief 64 in the ring valve assembly 48 which connects one or more passages 66 therethrough. The sleeve piston 46 has one or more radial passages, or ports, 68 which coact with the passages, or ports, 66 in the ring valve. In addition, the sleeve piston 46 is formed with one or more tapered axial passages 70, and coacts with a stationary internal cylinder part 72. The sleeve piston 46 also has one or more peripheral axial passage 74 which coact with the passages 70.

The sleeve piston 46 divides the cylinder of the piston-valve assembly 28 into a pair of opposed expansible chambers 76 and 78, the fluid in chamber 76 being acted upon by circular piston surfaces 80, and the fluid in chamber 78 being acted upon by annular piston surface 82. The expansible chamber 76 is connected to the conduit 30, and the expansible motor chamber 78 is connected to the conduit 32. Make-up oil for the expansible chambers 76 and 78, which oil is separated at all times from the oil supplied by pump 36, is supplied through a spring biased ball check valve having an inlet 86 which is submerged within the crank case 26, as seen in FIGURE 2, when the crank case is substantially full of oil under normal engine operating conditions. A spring 88 is disposed between the sleeve piston 46 and the cylinder of the piston-valve assembly 28, and against a shoulder on the cylinder, the spring 88 being engageable by the surface 56 of the ring valve 48.

The assembly 28 operates as a motor-pump unit with periodic reversing output flows whenever the engine driven pump 36 is operated and flow is not blocked in either of the conduits 30 or 32. Thus, referring to FIGURES 2 and 4 through 6, the output of pump 36 is supplied through conduit 42 to the chamber 90 of the piston-valve assembly and acts constantly on annular surfaces 56 and 58 of the sleeve valve 48 and the annular surface 50 of the sleeve portion 46 tending to maintain the sleeve piston 46 and the ring valve 48 against the left hand cylinder end as shown in FIGURE 2. However, the oil also flows through annular relief 64 and ports 66 and 68 to chamber 92 thereby acting on sleeve valve annular surface 60 and annular piston surface 52 in the opposite direction. Since the oil is under the same pressure, and since the combined areas 52 and 60 are greater than the areas 50, 56 and 58, the sleeve piston 46 and the ring valve 48 will move to the right, and after a slight movement to the right the sleeve valve surface 62 likewise becomes effective. The sleeve valve 48 will be maintained in engagement with the piston shoulder 54. During movement of the sleeve piston 46 and ring valve 48 to the right, the motor chamber 92 is expanded, while the pump chamber 78 is collapsed thereby forcing oil under pressure through the conduit 32. Simultaneously, the pump chamber 76 is expanded to draw oil from the conduit 30.

Figure 5:
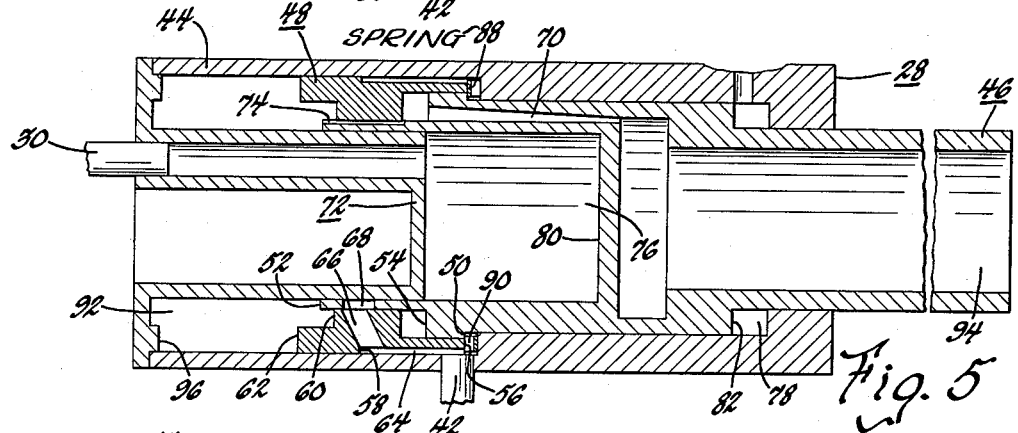

The ring valve 48 will continue to move to the right with the sleeve piston 46 until the surface 56 of the ring valve engages the spring 88. Thereafter, the sleeve piston 46 will move relative to the ring valve 48 while the ring valve 48 compresses the spring 88. During relative movement between the sleeve piston 46 and the ring valve 48, the axial passages 74 will be uncovered thereby connecting motor chamber 92 to drain, or to the crank case, through passages 74, piston passages 70 and the piston cavity 94. Simultaneously, the intake ports 68 to the motor chamber 92 are closed due to relative movement between the sleeve piston 46 and the ring valve 48 as seen in FIGURE 5.

Figure 6:
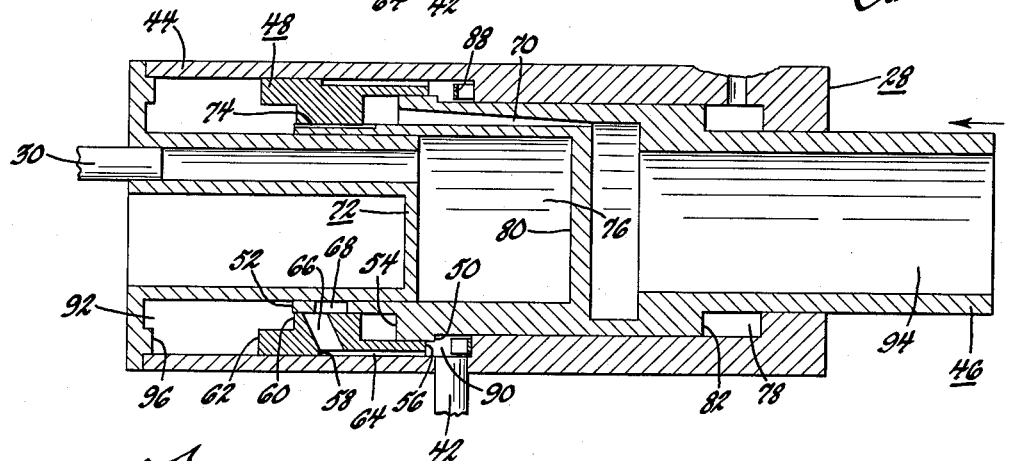

Since the spring 88 was compressed by the ring valve 48 when the chamber 92 was pressurized, when the pressure drops in chamber 92 due to the opening of exhaust ports via passages 74 and 70 and the piston cavity 94, the spring 88 moves the ring valve 48 to the left, and at this time the oil entering via conduit 42 acts on ring valve surfaces 56 and 58, and sleeve piston surface 50 thereby resulting in conjoint movement of the ring valve 48 and the sleeve piston 46 to the left. During this movement the ring valve and sleeve piston remain spaced apart as seen in FIGURE 6. Thus, pump chamber 78 will be expanded and pump chamber 76 will be collapsed thereby forcing oil under pressure to conduit 30 and drawing oil through conduit 32. The ring valve 48 will bottom out by engaging cylinder head shoulder 96 prior to the sleeve piston 46 bottoming out. Thus, the sleeve piston 46 will again move relative to ring valve 48 due to pressure acting on the surface 50 from motor chamber 90 so as to open the intake ports 66 and 68 thereby interconnecting the conduit 42 and the motor chamber 92 and closing the exhaust ports through passages 74 and 70. Accordingly, the sleeve piston 46 and the ring valve 48 will reverse its motion and move towards the right.

It will be appreciated that the piston-valve assembly 28 constitutes a motor-pump in which the actuating oil for the motor is at all times separated from the pump oil. The flows from the pump chambers are periodically reversed in accordance with the reciprocating movements of the sleeve piston 46, and thus the motor-pump also acts as a reversing valve. Thus, it will be appreciated that the piston-valve assembly 28 can be used as an accessory power source to actuate any reciprocating mechanism such as a windshild wiper motor, a window lift, door actuators or antenna actuators. However, in the specifically disclosed embodiment, the piston-valve assembly 28 is utilized to operate a windshield wiper motor as shown in FIGURES 7 through 11.

The windshield wiper motor 20 comprises a centrally arranged valve block 100 having a pair of cylinder sleeves 102 and 104 attached thereto and extending in opposite directions. The cylinders 102 and 104 contain pistons 106 and 108, respectively, the pistons being of generally cup-shaped configuration and attached to a common piston rod 110. The piston rod 110 has an axial through bore 112 with connecting radial passages 114 and 116, which interconnect the opposed end cylinder chambers 118 and 120. The tubular links 16 and 18 are suitably connected to the projecting ends of the piston rod 110 and are engaged by ring-type seals 122 and 124, respectively. The piston 106 divides the cylinder 102 into the end chamber 118 and an actuating chamber 126, while the piston 108 divides the cylinder 104 into the end chamber 120 and an actuating chamber 128.

The wiper motor 20 can be attached to any suitable support, such as the vehicle firewall by one or more bolts 130 which engage tapped holes in the valve block 100. The valve block 100 is formed with an axially extending annular groove 132, and the piston 106 carries an annular sealing ring 134 adapted to slide into and out of the groove 132 upon extended movement of the piston assembly during parking. The conduit 32 is connected to a passage 136 of the valve block 100, and the conduit 30 is connected to a passage 138 of the valve block. Passage 136 communicates directly with the actuating chamber 126. Passage 138 communicates with a valve bore 140 containing a manually operable needle valve 142 having a tapered throttling surface 144. The needle valve 142 is supported for reciprocable movement between "off," "start," "wide-open," and "break-away" positions, and is held in assembled relation with the valve body by a fitting 146. The valve bore 140 is connected to the actuating chamber 128 through a valve block passage 148. The actuating chamber 126 can also be connected to the valve bore 140, in certain instances, to be described hereinafter, through a valve block passage 150.

The end of the needle valve 142 can engage a leaf spring 152. One end of the leaf spring constitutes a valve for a passage 156 and the other end constitutes a latch for a pivotally mounted swing check valve 158 which, when closed, blocks passage 160. Passage 160 connects with passage 150, the passage 160 communicating with the annular groove 132. The valve bore 140 contains a valve seat 162 with which the tapered surface 144 coacts to throttle the flow of oil. The needle valve can be firmly seated against the valve seat when it is in the parked position, so as to prevent oil flow between valve bore 140 and passage 148. In addition, the needle valve 143 is formed with an annular groove 164, the purpose of which will be described hereinafter.

When the needle valve 142 is in the "on" position, that is where the end thereof is disengaged from the leaf spring 152 and the tapered surface 144 is spaced from the valve seat 162, the alternate flows from the piston-valve assembly 28 through conduits 30 and 32 will result in reciprocating movement of the tandem pistons 106 and 108 and the piston rod 110 so as to reciprocate the drive links 16 and 18, and hence impart oscillation to the wiper blades 12 in phase opposition. The frequency of wiper movement, that is the number of wiper strokes per minute, will, of course, be determined by the throttling of the oil between the valve seat 162 and the tapered needle valve surface 144. However, the velocity of the wiper blades will not vary proportionate to the throttling of the oil through the needle valve due to the inherent action of the piston-valve assembly 28. Since the pump chambers of the piston-valve assembly and the actuating chamber of the motor 20 are always connected in what may be termed a closed hydraulic loop, a phenomenon termed "hesitation" occurs in the piston-valve assembly when it reaches its left hand stroke end position as shown in FIGURE 3. This hesitation is caused by the time required to repressurize the actuating fluid in chamber 92 and compress any air which is in the system so as to accelerate the sleeve piston to the right. Thus, at low speed settings of the valve 142, the velocity of wiper blade movement may be on the order of two-thirds of high speed setting, but a dwell, or hesitation, occurs at the inboard stroke ends of the wiper blades. This inherent function of the piston-valve assembly 28 appreciably reduces blade chatter which is caused by slow speed movement of wiper blades over a semi-wet or semi-dry windshield.

During running operation of the wiper motor 20, the wiper blades 12 are moved throughout angle A, and when the needle valve 142 is moved to the fully "off" position the wiper blades are moved throughout a parking angle B beyond their normal inboard stroke ends to depressed parked positions where they will lie flat against the lower reveal molding of the windshield. During parking operation, the valve 142 is moved into engagement with the valve seat 162, thereby deflecting the leaf spring 152 to open the passage 156 as seen in FIGURE 10. Accordingly, when oil flows through conduit 30 to passage 138, it will flow to actuating chamber 128 through the passage 154 and a spring biased ball check 154, thus effecting movement of the piston assembly to the left, as viewed in FIGURE 7. When the piston-valve assembly reverses, the oil from conduit 32 will flow through passage 136 to the actuating chamber 126, and thence flow through the swing check valve 158 back to drain to the passage 138 thereby resulting in the piston assembly 106, 108 remaining stationary. When the piston-valve assembly 28 again reverses, the oil is forced again through passage 156 and ball check valve 154 to actuating chamber 128 to move the pistons 106, 108 further to the left whereat the piston 106 will engage the valve block 100, which extends the stroke of the wiper blades to their depressed park positions. Movement of the wiper motor piston is thus arrested, as is movement of the piston-valve assembly.

When the valve 142 is again opened to initiate operation of the wiper blades, oil is first supplied to actuating chamber 126 to move the pisition assembly 106, 108 to the right. When the piston valve assembly 28 reverses, the position 106 moves to the left until the ring 134 enters the groove 132. Since the check valve 158 is held closed at this time, oil can only escape by leaking around the ring 134 or the piston 106 until the piston valve assembly 28 again reverses. Thus, eventually the wiper motor will resume its normal stroke to move the wiper blades throughout the angle A.

Another feature of the wiper motor 20 is that of being capable of applying torques to the wiper blades 12 in opposite directions without moving the wiper blades if they are frozen to the windshield. This is achieved by movement of the manual control valve 142 beyond the normal wide open position wherein the groove 164 interconnects restricted passages 150 and 160 with passage 148 thereby establishing a restricted communication between the actuating chambers 126 and 128. Under these circumstances the piston-valve assembly 28 will continue to reciprocate and thus impart alternate forces to the piston assembly 106, 108 so as to loosen the wiper blades. The passages in the piston rod connecting the end chambers 118 and 120 of the wiper motor permit the free flow of any seepage oil between the two chambers, and thus prevent fluid from being trapped in these chambers which would otherwise interfere with operation of the wiper motor.

While the embodiment of the invention as herein disclosed constitutes a preferred form, it is to be understood that other forms might be adopted.

What is claimed is as follows:

1. A piston-valve assembly for automatically pressurizing fluid in alternate directions in a closed loop system including, a cylinder, a reciprocable sleeve piston disposed in said cylinder, a ring valve slidably supported on said sleeve piston and adapted for movement relative thereto, said sleeve piston and said ring valve dividing said cylinder into opposed motor chambers and opposed pump chambers and having differential areas exposed to said motor chambers, means connecting a source of fluid under pressure continuously to the motor chambers having the smaller of said differential areas exposed thereto, coacting port means in said sleeve piston and ring valve for interconnecting said motor chambers in one relative position between said ring valve and said sleeve piston, and exhaust port means in said sleeve piston controlled by said ring valve for connecting said other motor chamber to drain at another relative position between said ring valve and said sleeve piston whereby said sleeve piston will be continuously reciprocated to effect alternate expansion and contraction of said pump chambers to automatically pressurize the fluid in said closed loop in alternate directions.

2. A piston-valve assembly for automatically, alternately pressurizing fluid in a closed loop system in opposed directions including, a cylinder, a reciprocable sleeve piston disposed in said cylinder, a valve slidably mounted on said sleeve piston, said sleeve piston and said valve dividing said cylinder into opposed motor and pump chambers and having differential areas exposed to said including, a wiper motor having a pressure differential operated piston, a manually operable control valve for throttling the flow of hydraulic fluid to and from said motor, and a closed loop hydraulic fluid supply for said motor which is alternately pressurized in opposite directions whereby movement of said manual control valve to a slightly open position so as to effect substantial throttling of the flow of hydraulic fluid to and from said motor.

ly operable control valve having a position for opening said restrictive flow path between said expansible motor chambers whereby said closed loop hydraulic system will apply alternate forces to said piston means in opposite directions without necessitating any movement thereof.

13. A hydraulically operated windshield wiper system including, a wiper motor having a housing with a pair of expansible chambers and pressure differential operated piston means therein, a closed loop hydraulic supply system connected to said expansible chambers and providing alternate pressurized flows in opposite directions, a manual control valve connected in said closed loop and having a position wherein alternate pressurized flows in opposite directions subject the piston means to differential pressures in alternate directions to reciprocate the same throughout a running stroke, and valve means actuated upon movement of said manual control valve to an "off" position for connecting one of said expansible motor chambers with the other side of said closed hydraulic loop so as to arrest said piston means.

14. A hydraulically operated windshield wiper system including, a wiper motor having a housing with a pair of expansible chambers and pressure differential operated piston means therein, a closed loop hydraulic supply system providing alternate pressurized flows in opposite directions, a pair of conduits connecting said hydraulic supply system with said opposed expansible motor chambers, a manual control valve in said housing for controlling the flow of fluid to and from one of said motor chambers through one of said conduits, said manual control valve having an "on" position wherein said piston means is subjected to differential pressures in alternate directions to reciprocate the same, and an "off" position wherein said reciprocation of said piston means is arrested in a park position, a one-way check valve interconnecting the other of said motor chambers with said one conduit, and means permitting opening movement of said check valve when the manual valve is moved to the "off" position so that fluid flow to said other motor chamber flows through said check valve to said one conduit to arrest movement of said piston means.

15. The combination set forth in claim 14 wherein said last recited means comprises a movable spring latch for said check valve.

References Cited in the file of this patent

UNITED STATES PATENTS

| | | |
|---|---|---|
| 2,343,656 | Folberth | Mar. 7, 1944 |
| 2,876,747 | Dermond | Mar. 10, 1959 |
| 3,070,959 | Giampapa | Jan. 1, 1963 |